United States Patent Office 3,118,778
Patented Jan. 21, 1964

3,118,778
AGGREGATES OF SLAGS
Franz Rodis, Knapsack, near Cologne, and Josef Cremer, Hurth-Hermulheim, Germany, assignors to Knapsack-Griesheim Aktiengesellschaft, Knapsack, near Cologne, Germany, a corporation of Germany
No Drawing. Filed Apr. 15, 1960, Ser. No. 22,387
Claims priority, application Germany Apr. 22, 1959
2 Claims. (Cl. 106—86)

The present invention relates to aggregates having substantially closed pores.

It is known that slags obtained as by-products in many processes of the chemical and metallurgic industries can be used for various industrial purposes in the form of slag sand, slag wool, gravel or cast bricks. In the first place the building materials industry is interested in substances that are suitable as aggregates for the manufacture of light concrete, such as blast furnace slags.

It has now been found that slags obtained, for example, in electrothermal phosphate reduction furnaces, after having been foamed by the process disclosed in U.S. patent application Serial No. 815,715 filed May 25, 1959, can be used with special advantage as aggregates for light concrete for the manufacture of molded bricks, heaped and reinforced concrete.

Briefly in the above-mentioned copending application is disclosed a technique for foaming slags, particularly short slags, by treating the hot liquid in a special container equipped with water and gas difusion means whereby water, steam, and air are injected into the liquid slag causing it to become a thick fluid pulp, and then, in a second step, increasing the surface area of the still-liquid material and feeding a measured amount of additional water into the slag until it solidifies as a foam.

In the manufacture of light concrete the exact dosing of the mixing water is rather difficult since part of the mixing water is always absorbed by the open pores of the aggregates and thus loses its function as mixing water. The other part of the mixing water adheres purely externally to the surface of the aggregates, as it is always the case, for example with compact aggregates, such as gravel or quartz sand. When this fact is not taken into account and an insufficient amount of mixing water is added, there arises the danger that the cement "burns" or "parches." In practice this danger can be obviated for example by abundantly wetting the aggregates for a prolonged period, so that they are at least damp, that is to say saturated with water when being used.

It is, therefore, obvious that aggregates having open or only partially closed pores always require the addition of a higher amount of water than non-absorbing aggregates. Said higher water content implies a higher water/cement ratio and a lower resistance to compression than could be obtained with the amount of cement used. Moreover, the higher water content results in a longer setting period of the cement so that the forms can be removed from the light concrete only after a longer period of time.

When a slag is used as aggregate, which has been foamed in a definite manner, the difficulty in dosing the mixing water surprisingly does not appear and the required amount of water can be exactly determined. The reason for this phenomenon is that the pores of the foamed slag are completely closed. Thus, when wetted with water the slag can only hold the liquid particles adhering to the surface but cannot absorb said particles by capillary action.

Slags with closed pores are already known, but in these slags at most 85% of the pores are closed while at least 15% of the residual pores intercommunicate and thus possess an absorbing action.

As compared therewith, in the slags produced by the process of the aforesaid patent specification more than 85%, namely up to 100% of the pores are closed, as has surprisingly been ascertained, the ratio of CaO to $SiO_2$ preferably being about 47 to 43.

Experiments carried out with said slag clearly proved that the difficulty in dosing the mixing water is completely done away with, even if the slag is used in an absolutely dry form, since only the surface of this foamed slag is wetted with water but no water can penetrate into the grain.

The fact that in said slag almost 100% of the pores are closed is due to the manufacturing conditions of the aforesaid selective process carried out in two controllable stages.

The novel substance, in the following briefly referred to as slag, has the following chemical composition: about 90% of calcium metasilicate, 3% of aluminum oxide, 6% of calcium fluoride and 1% of magnesium and alkali metal oxides.

The mineralogical examination of the slag under the polarization microscope and by structural analysis with the aid of X-rays indicates that about 80–90% of the slag is crystalline. The principal constituent of the slag is a substance which is chemically identical with wollastonite, a mineral occurring in nature. The slag furthermore contains small amounts of gehlenite, ackermanite and mixed crystals (melinites). In view of this mineral composition the slag can be designated as "technical wollastonite."

In finely comminuted form the slag has an alkaline reaction in water (pH 8–10), so that free acid cannot occur.

The swelling and contraction properties of the slag are as favorable as those of known blast furnace slags.

A special physical property of the slag is its uniform structure. The uniform distribution of pores of almost equal size with a sufficient thickness of the partitions is a necessary condition for the good grain stability and the favorable unit weight.

As already mentioned above, independent of their size, the pores are completely closed globular hollow spaces. The surface of the pore walls is glossy, smooth and so tight that, contrary to the known natural and artificial slags, a connection between the individual pore spaces does not exist. This fact distinctly results from the extremely low gas permeability of the slag which amounts to 0.0006 nPerm, a value that is four powers of ten smaller than the gas permeability of, for example, firebricks having a value of about 6.0 nPerm.

The pore volume fluctuates by about 70% as ascertained by determinations with cut cubes having an edge length of about 20 mm. The unit weight of the test samples is 0.7 g./cm.$^3$.

On account of its impermeability to gases, which also excludes the convective heat transfer, the slag is excellently suitable for heat insulating purposes. It is little sensitive to changes of temperature and still stable at a temperature above 1,000° C.; the heat transfer coefficient increases only slightly with rising temperature.

The following examples serve to illustrate the invention but they are not intended to limit it thereto.

*Examples*

In blast furnace slags the pores are only partially closed. The required total water content of a light concrete mixture produced with such a slag as aggregate is about 16% by weight (cf. Wesche, "Versuche an Schüttbeton aus Hüttenbims," Stahl und Eisen, 76 (1956), No. 1, pages 27–30).

For producing, for example, a concrete of grade B30 a cement content of about 170 kg./m.$^3$ is required, so that the water/cement factor is 0.95 (Wesche, "Beton aus porigen Stoffen," Bauverlag-G.m.b.H., Wiesbaden, page 2, FIGURE 2). Other known light concrete aggregates, such as natural pumice, broken bricks, bulking clay and the like, having preponderantly or exclusively open pores give, of course, higher water/cement factors.

When using the aggregates having closed pores according to the invention there are obtained, under otherwise identical conditions, water/cement factors of about 0.65. According to the Wesche reference (page 2, FIGURE 2) the indicated regularity of the water/cement value, which also applies to light concrete although to a limited extent, a reduction of the water/cement factor from about 0.95 to about 0.65 yields, under the condition of the same cement glue rigidity, an increase of the resistance to compression to about twice the value. In the manufacture of light concrete bricks this fact makes it possible either to reach the following higher grade, that is to say instead of grade V25 the grade V50 or instead of V50 the grade V75, or when an increase of the resistance to compression is not wanted a smaller amount of cement can be used.

The essential advantage of the slags to be used according to the invention resides in that the dry material can be used without preliminary wetting with water, whereby reproducible and, above all, smaller water/cement factors can be obtained. Higher resistances to compression or lower cement contents mean a better economy. Finished light concrete parts or heaped concrete walls harden at the beginning more rapidly so that shorter periods of storage are required, the transport weight is reduced and the forms may be removed after a shorter period. In the case of vapor hardening the heat consumption can be considerably reduced due to the fact that useless storage water, as occurs with absorbing aggregates, is not present. Finally, the more rapid drying of light concrete produced with the slag of the invention is of advantage, for example in apartment construction.

The following building materials were produced:

The aggregates A mentioned in the table are foamed slags according to the invention in which almost 100% of the pores are closed and the aggregates B are commercial blast furnace slags having only about 60% closed pores.

The table shows that with the use of the aggregates according to the invention building materials having special favorable properties can be produced. Example I reveals a distinct difference in the resistance to compression and the grade between the material produced with the aggregate A of the invention and the material produced with a known aggregate B. In Example II the difference especially exists in the dry unit weight and accordingly in the more favorable weight class obtained with the aggregate of the invention. Example III shows that with the use of the aggregates according to the invention a considerably lower amount of cement is required.

According to German industrial standard (DIN) 1045, § 5, grade B designates the minimum resistance to compression in kg./cm.$^2$ of a cube after 28 days for construction of steel concrete and according to DIN 18152, grade V designates the minimum resistance to compression of solid concrete bricks after 28 days.

DIN 1164 contains prescriptions for the manufacture of standard cements. A "cement 325" means for example that correspondingly prepared test samples possess after 28 days a resistance to compression of 325 kg./cm.$^2$. Further directions for the examination of concrete can be found in DIN 1048.

We claim:

1. Light weight concrete mixes containing a foamed slag aggregate having uniformly distributed pores in which more than 85% and up to 100% of the pores are closed, said aggregate being obtained from slag formed as a by-product in electrothermal phosphate reduction furnaces and containing calcium oxide and silicon dioxide in a ratio of about 47:43.

2. Light concrete mixes according to claim 1 wherein the slag aggregate consists of about 90% calcium metasilicate, about 3% aluminum oxide, about 6% calcium fluoride, and up to 1% manganese and alkali metal oxides.

References Cited in the file of this patent

UNITED STATES PATENTS

| | | |
|---|---|---|
| 2,021,956 | Gladney | Nov. 26, 1935 |
| 2,212,962 | Stuart et al. | Aug. 27, 1940 |
| 2,443,103 | Gallai-Hatchard | June 8, 1948 |
| 2,460,742 | Gallai-Hatchard | Feb. 1, 1949 |
| 2,590,901 | Stout et al. | Apr. 1, 1952 |
| 2,590,902 | Stout et al. | Apr. 1, 1952 |
| 2,778,160 | Gallai-Hatchard | Jan. 22, 1957 |
| 2,977,239 | Patsons | Mar. 28, 1961 |

OTHER REFERENCES

Lea et al.: "Chemistry of Cement and Concrete," pub. 1956 by Edward Arnold, Ltd., London. (Chapter XV relied upon.)

| Examples | Percent by volume | Aggregates | Granulation, mm. | Cement content, kg./m.$^3$ | Water/cement factor | Dry unit weight, kg./m.$^3$ | Resistance to compression, kg./cm.$^2$ | Weight class, class, kg./m.$^3$ | Grade |
|---|---|---|---|---|---|---|---|---|---|
| I | 70 | aggregate A | 3–15 | 160 | 0.75 | 1,450 | 90 | 1,400–1,600 | V75 |
|   | 30 | quartz sand | 0–7 | | | | | | |
|   | 80 | aggregate B | 3–15 | 160 | 0.90 | 1,460 | 70 | 1,400–1,600 | V50 |
|   | 20 | quartz sand | 0–7 | | | | | | |
| II | 80 | aggregate A | 3–15 | 160 | 0.65 | 1,300 | 70 | 1,200–1,400 | V50 |
|   | 20 | quartz sand | 0–7 | | | | | | |
|   | 80 | aggregate B | 3–15 | 160 | 0.90 | 1,490 | 70 | 1,400–1,600 | V50 |
|   | 20 | quartz sand | 0–7 | | | | | | |
| III | 70 | aggregate A | 3–15 | 160 | 0.75 | 1,450 | 90 | 1,400–1,600 | V75 |
|   | 30 | quartz sand | 0–7 | | | | | | |
|   | 80 | aggregate B | 3–15 | 185 | 0.85 | 1,490 | 95 | 1,400–1,600 | V75 |
|   | 20 | quartz sand | 0–7 | | | | | | |